UNITED STATES PATENT OFFICE.

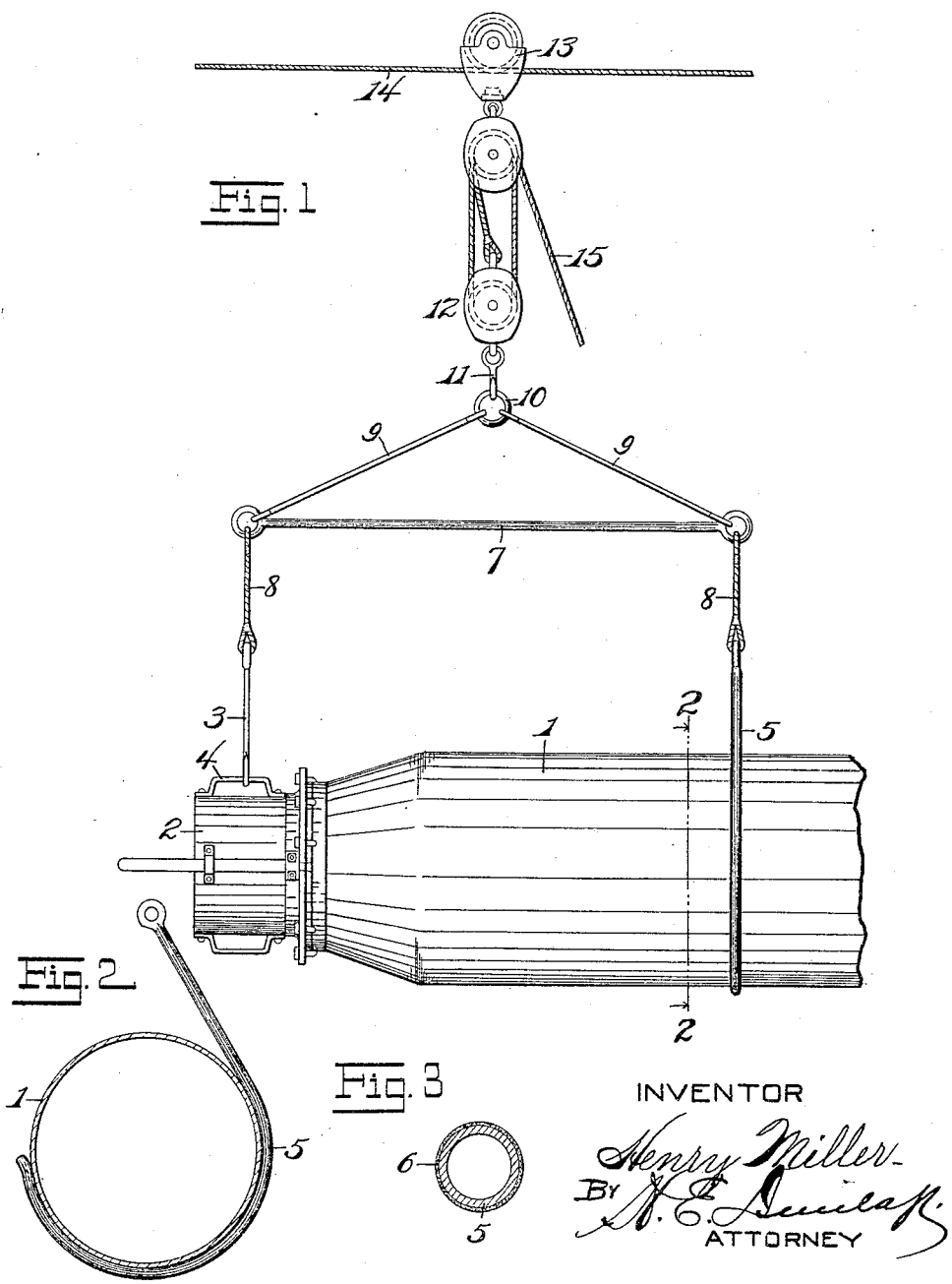

HENRY MILLER, OF WASHINGTON, PENNSYLVANIA.

TRANSFER APPARATUS FOR GLASS CYLINDERS.

1,199,291.  Specification of Letters Patent.  Patented Sept. 26, 1916.

Application filed March 29, 1916. Serial No. 87,430.

*To all whom it may concern:*

Be it known that I, HENRY MILLER, a citizen of the United States of America, and resident of Washington, county of Washington, and State of Pennsylvania, have invented certain new and useful Improvements in Transfer Apparatus for Glass Cylinders, of which the following is a specification.

This invention relates broadly to apparatus for facilitating the handling of drawn glass cylinders, and more particularly to a strain-equalizing transfer device for such cylinders.

The primary object of the invention is to provide a simple transporting device whereby the bait ends of heavy glass cylinders formed by a vertical drawing process are supported in transferring said cylinders to the capping horse.

A further object is to provide a device of the character mentioned by means of which the cylinder is relieved of the strains which have heretofore been incident to the application of a too great lifting force to the bait.

A hand method has heretofore obtained in the handling of glass cylinders of the character mentioned, said method requiring the employment of two men at the bait end of the cylinder. When the cylinder was lowered to a horizontal position, one man grasped the handle of the metal bait with a long-handled hook while the second man placed a long-handled hook under the body of the cylinder at a point located approximately three feet distant from the bait. Unless a substantially equal lifting force were at all times exerted by these two men, such an unequal strain was placed upon the cylinder at the point of application of the greater force that breakage resulted at that point. Further, great danger has always attended this method of handling cylinders, due to the fact that when breakage occurred at a point close to the bait, the entire weight of the cylinder was instantly thrust upon the rearmost attendant, who, under the sudden and violent impact of the additional great weight imposed upon him, would, unless well balanced at the moment, be thrown to the floor in the midst of the breaking glass of the cylinder.

It is therefore the purpose of the present invention to obviate the breakage of cylinders with its attendant dangers, above mentioned, by the provision of a mechanical carrying apparatus by means of which unequal, or breakage, strains are eliminated, and which requires the service of but one attendant in its operation.

With these and other objects in view, the invention resides in the features of construction, arrangement of parts and combinations of elements which will hereinafter be exemplified, reference being had to the accompanying drawings, in which—

Figure 1 is a front elevation of the invention, illustrating its application; Fig. 2 is a section on line 2—2, Fig. 1, showing the cylinder-engaging hook; and Fig. 3 is an enlarged cross-section of said hook.

Referring to said drawings, 1 indicates a drawn glass cylinder which has been lowered to a horizontal position following the bait-drawing process in which it is formed, and 2 indicates the bait attached to the front end of said cylinder. Having been lowered in the usual manner, a hook 3 is inserted into engaging relation with a loop or handle 4 provided for the purpose, said handle being rigidly attached to the side of said bait, and a second hook 5, preferably having an asbestos covering 6, is swung into underlying supporting relation to the body of the cylinder at a suitable distance rearward with respect to said bait. Said hooks are respectively suspended from the opposite ends of a horizontal spreader, or equalizing bar, 7 by means of flexible ropes or cables 8 of suitable length. Said spreader has eyes formed in its opposite ends in which are engaged the lower ends of a pair of convergently inclined links 9 whose upper ends are loosely attached to a ring 10, hereinafter termed an equalizer ring, which is attached to the depending hook 11 of a pulley hoist block 12 of a common form, said block being suspended from a trolley conveyer 13 which travels upon a suitably disposed overhead cable or track 14. By manipulation of the cable 15 of hoist 13 the elevation of the cylinder may be conveniently adjusted by a single attendant who then shifts the cylinder by means of the trolley conveyer to a position over the capping horse, whereupon he lowers the cylinder by slacking said cable.

As is obvious, the carrying strains to which the cylinder is subjected are equalized between the supporting hooks 3 and 5, the bar 7 securing uniformity of load on said hooks, and the cylinder is thus relieved from undue, or breakage, strains due to unequal or unbalanced lifting force applied thereto. Furthermore, as is apparent, the work which has hitherto been performed by arduous labor on the part of two workmen is accomplished by one man with comparative ease and with perfect safety from accidental injury.

An additional advantage possessed by the invention herein disclosed resides in the fact that the hook 5 will itself support the front end of the cylinder in the event that breakage occurs close to the bait after the cylinder has been lowered and is on its way to the capping horse, as infrequently happens due to a rupture developed during the drawing operation.

While I have herein shown and described a practical embodiment of my invention, it will be understood that the latter is not confined to a strict conformity with the showing of the drawings, but may be modified in the form and arrangement of its parts to the extent that such modification marks no material departure from the salient features defined in the appended claims.

What is claimed is—

1. In transfer apparatus for drawn glass cylinders having an attached bait, a handle carried by said bait, a trolley conveyer, a pulley hoist suspended from said conveyer, an equalizing bar suspended in a horizontal position from said hoist, a hook suspended from one end of said bar and designed to interengage the bait handle, and a hook suspended from the opposite end of said bar designed to assume direct carrying relation to the cylinder body at a point remote from said bait.

2. In transfer apparatus for glass cylinders, the combination with an overhead carriage, of a pulley hoist suspended from said carriage, links pivotally connected to said hoist and occupying divergently inclined positions, a horizontal equalizing bar having its ends supported by said links, hooks suspended from the ends of said bar, a bait attached to the cylinder, hook-engaging means carried by said bait, one of said hooks being designed to engage said means and the other hook being designed to assume direct carrying relation to said cylinder at a point located a suitable distance from said bait.

In testimony whereof, I affix my signature in presence of two subscribing witnesses.

HENRY MILLER.

Witnesses:
 MINNIE B. FLEMING,
 THOS. STENHOUSE.

Copies of this patent may be obtained for five cents each, by addressing the "Commissioner of Patents, Washington, D. C."